E. LEWIS.
VEGETABLE SLICER.
APPLICATION FILED MAR. 26, 1914.
1,157,013.
Patented Oct. 19, 1915.
3 SHEETS—SHEET 1.
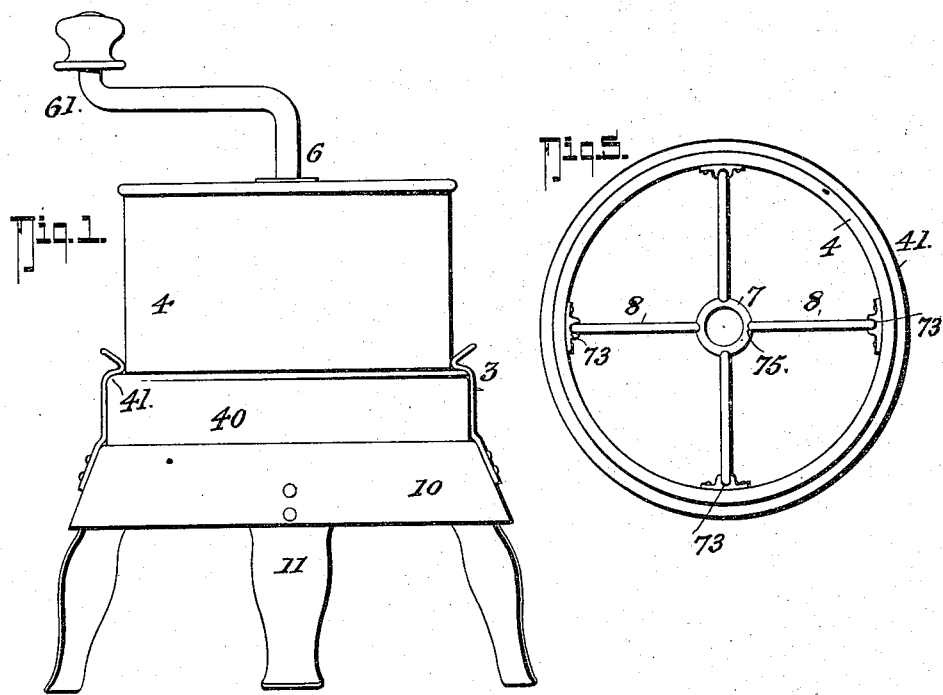
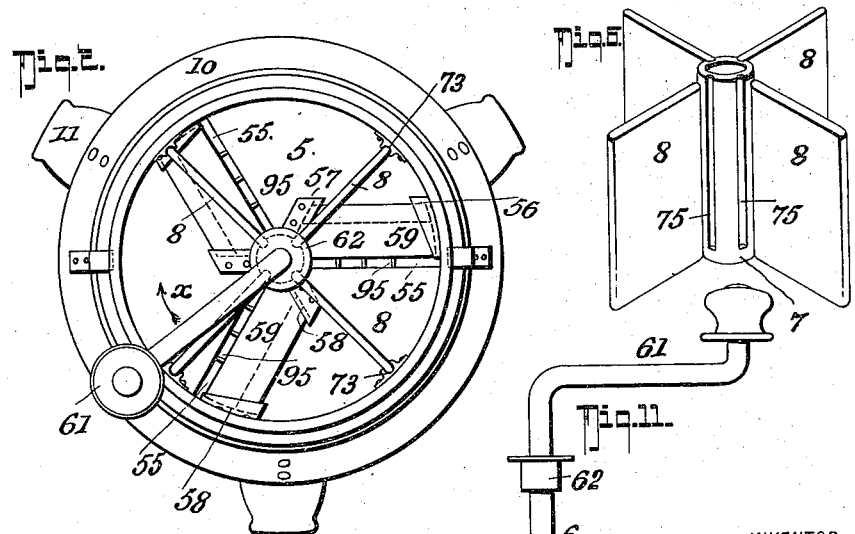
WITNESSES:
Charles J. Diller.
Mae E. Immich.
INVENTOR
Elias Lewis.
BY
Fred G. Dieterich
ATTORNEY

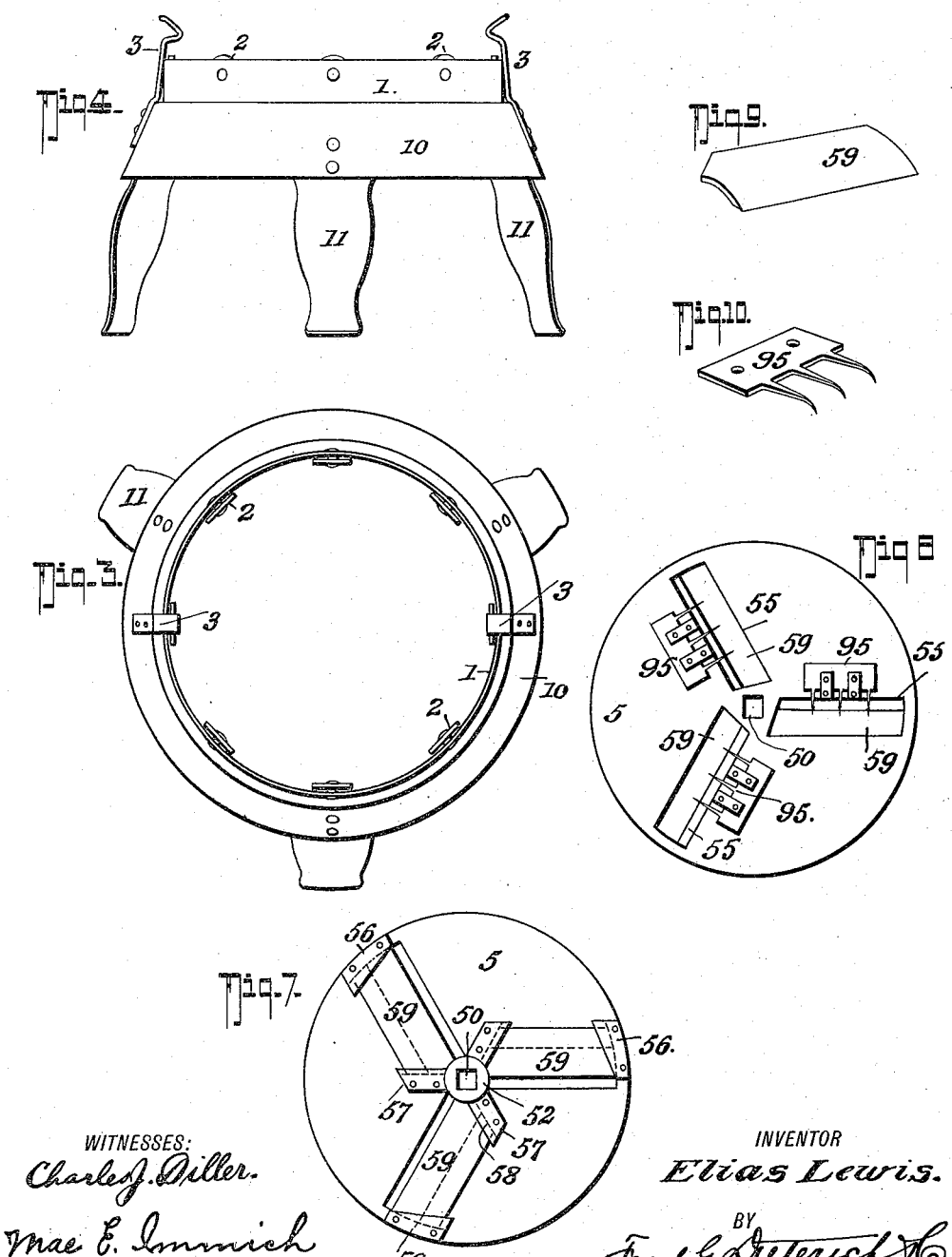

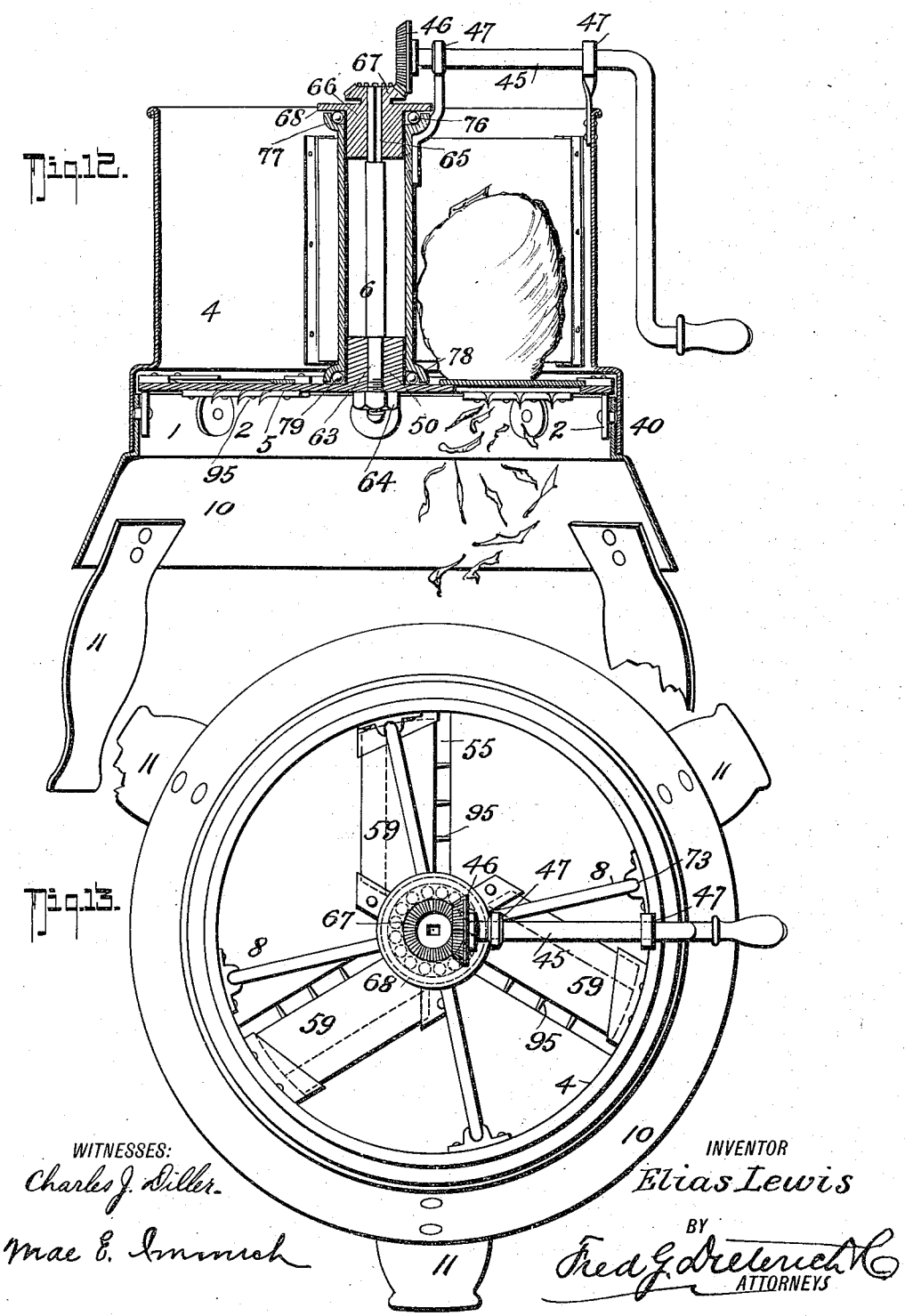

UNITED STATES PATENT OFFICE.

ELIAS LEWIS, OF TERRE HAUTE, INDIANA.

VEGETABLE-SLICER.

1,157,013.   Specification of Letters Patent.   Patented Oct. 19, 1915.

Application filed March 26, 1914. Serial No. 827,331.

*To all whom it may concern:*

Be it known that I, ELIAS LEWIS, residing at Terre Haute, in the county of Vigo and State of Indiana, have invented a new and Improved Vegetable-Slicer, of which the following is a specification.

This invention has reference to that class of machines or appliances more particularly adapted for domestic uses for slicing potatoes, tomatoes, onions, kraut and other like vegetables, and it primarily has for its object to provide an appliance of the general character stated of a simple and economical construction, which can be easily manipulated and safely operated by anyone.

Another object of my invention is to provide an appliance for the purposes stated, in which the parts are coöperatively so combined and arranged that they can be easily assembled for use or taken apart, making it easy to keep clean, and in which they operatively connect and coöperate so that danger of breaking any of the said parts is reduced to the minimum.

With other objects in view, that will be hereinafter referred to, my invention consists in the peculiar arrangement and novel combination of parts, all of which will be hereinafter first described, specifically pointed out in the appended claims and illustrated in the accompanying drawings, in which:

Figure 1 is a side elevation of my invention, the parts thereof being assembled for use. Fig. 2 is a top plan view thereof. Fig. 3 is a top plan view and Fig. 4 is a side elevation of the base member. Fig. 5 is a top plan view of the hopper. Fig. 6 is a perspective view of the hopper division members. Fig. 7 is a top plan view. Fig. 8 is an inverted plan view of the cutter carrying disk. Fig. 9 is a perspective view of one of the slicing knives. Fig. 10 is a similar view of one of the "splitter" knives hereinafter referred to. Fig. 11 is a side elevation of the crank shaft. Fig. 12 is a vertical section that shows a somewhat modified construction of my invention hereinafter specifically referred to. Fig. 13 is a plan view thereof.

In the practical construction, my slicing appliance includes a rim or base, a hopper, a cutter carrying disk that operates in the bottom of the hopper, and a crank handle for connecting with the disk, the several parts being so constructed and arranged to interengage with each other, when assembled, in such a manner, that they are held to their operative condition without the necessity of using bolts, screws and the like.

The supporting base comprises an annular vertical rim 1 having a flaring base 10 provided with legs 11, which may be formed integral with or be otherwise fixedly connected with the base 10. A series of roller bearings 2 are journaled on the inside of the rim 1, with their upper or bearing faces in a plane slightly above the rim 10, as shown.

3—3 designate a plurality of snap spring catches secured upon the outside of the rim 1, the purpose of which will presently appear.

4 designates a cylindrical hopper which includes an annularly enlarged base 40 whose upper edge forms a locking flange 41 adapted for being engaged by the snap springs 3—3, when the hopper is in operative position, as shown in Fig. 1.

5 designates a cutter disk which, when the parts are assembled, rests and is rotatably mounted upon the roller bearings 2—2, and the said disk has an axial non-circular aperture 50 for receiving the end 60 of a crank shaft 6, that has the usual handle 61 that projects over and beyond the outer edge of the hopper (see Fig. 1). The disk 5 has a central inwardly extended hub 52 which when the parts are operatively combined, extends up into and is guided in a tubular central post 7 whose outer face is formed with a plurality of vertical grooves 75, four being shown, that extend from the upper end to near the lower end thereof. The lower end of the post 7 rests upon the disk 5 and it forms the support for the upper end of the handle shaft 6, the latter having a plug bearing 62 that loosely fits into the upper end of the said post 7, as shown.

8—8 designate division plates or wings having one end fitted within the grooves 75 in the post 7 and the other ends engaging the groove guides 73 formed upon the inside of the hopper, as shown. By forming the central hub 7 and the hopper with registering vertical guide grooves, as shown and described, the partition plates 8 can be readily fit in place or lifted out to form that hopper into two or more compartments, as described.

The cutter slicer disk 5, before referred to, is formed with a series, three being shown, of radial slots 55 and at the outer end of each slot a keeper 56 is secured upon the plate, a similar number of the said keepers, (see 57) being secured to the hub part of the disk. The guides or keepers 56 and 57 have tapered bearing edges 58 so inclined with respect to the setting of the knife or slicer blades 59 that the said slicer blades 59 become wedged in place during the operation of cutting, it being understood that the disk with the knives, moves in the direction indicated by the arrow $x$.

It will be noticed, since the lower ends of the hopper division plates are held just high enough to allow for a free passage thereunder of the disk with the cutters, the knife edges will continuously slice off the bottom parts of the potatoes or other vegetables held in the several compartments of the hopper, it being apparent that as fast as the slices are separated from the vegetable the cut portions fall down through openings in the disk into a suitable receptacle provided for receiving the same. To further cut up the sliced particles as they drop down through the slots 55, a series of splitter knives 95 are secured up the under side of the disk, and whose splitter fingers project over the slot or passage, through which the sliced particles pass when separated from their bulk.

From the foregoing description taken in connection with the accompanying drawings, the complete construction, the manner in which my appliance operates, and the advantages thereof will be readily apparent. By detachably mounting the hopper partitions as stated one or more of the particles can be taken out to adapt the hopper for receiving the larger or smaller sizes of vegetables or for receiving heads of cabbage as desired. Again, the knives can be readily removed and replaced at will and thinner or thicker blades can be used to provide for cutting thick or thin slices.

Figs. 12 and 13 of the drawings illustrate a somewhat modified construction of my invention, and in the said construction, the lower end of the crank shaft 6 terminates in a threaded stem 63 that passes down through a round aperture in the hub 50 and is secured by a nut 64. The upper end of the said shaft 6, in the modified construction, terminates in a non-circular shank 65 that engages the apertured hub 66 that fits in the upper end of the tubular post 72, and which is integral with a bevel gear 67 and a horizontal flange 68 that rides upon ball bearings 76 seated in the ball race 77 formed on the upper end of the post 72, and the latter, in my present construction also has a ball race 78 at the lower end that receives the bearing balls 79 that ride upon the cutter disk, as shown. In the modified form shown in Figs. 12 and 13, the division members 8 are integral or otherwise fixedly connected with the post 72 and power is applied to the slicing disk, by a crank shaft 45 having a bevel gear 46 that meshes with the gear 67 and which is journaled in a bracket bearing 47 secured to the hopper and a like bearing 48 secured to the tubular post 72.

What I claim is:

1. In a vegetable slicer, a base including a rim, bearing rollers mounted on the walls of said rim, a hopper including an enlarged shouldered rim to fit over said base rim and leave a cutter disk receiving space, a cutter disk located in said space and resting on said rollers, said cutter disk having a hub, a tube post, the lower end of which projects over and receives said hub, said tube post extending upwardly through said hopper, a shaft projecting through said tube post and held in said cutter disk hub, a bearing plug on said shaft fitted into the upper end of said tube post, means for turning said shaft, and division plates connecting said tube post with said hopper and holding said tube post in position.

2. In a vegetable slicer, a base including a rim, bearing rollers mounted on the walls of said rim, a hopper including an enlarged shouldered rim to fit over said base rim and leave a cutter disk receiving space, a cutter disk located in said space and resting on said rollers, said cutter disk having a hub, a tube post, the lower end of which projects over and receives said hub, said tube post extending upwardly through said hopper, a shaft projecting through said tube post and held in said cutter disk hub, a bearing plug on said shaft fitted into the upper end of said tube post, means for turning said shaft, and division plates connecting said tube post with said hopper and holding said tube post in position, said tube post having ball races at each end, bearing balls in said ball races, the balls in the lower ball race engaging said cutter disk, said bearing plug having a flange to engage the balls in the upper race substantially as shown and described.

ELIAS LEWIS.

Witnesses:
WALTER W. DEARDORF,
MARY M. YOST.